J. KAUTZ.
ROASTING PAN.
APPLICATION FILED DEC. 6, 1909.
965,636.
Patented July 26, 1910.
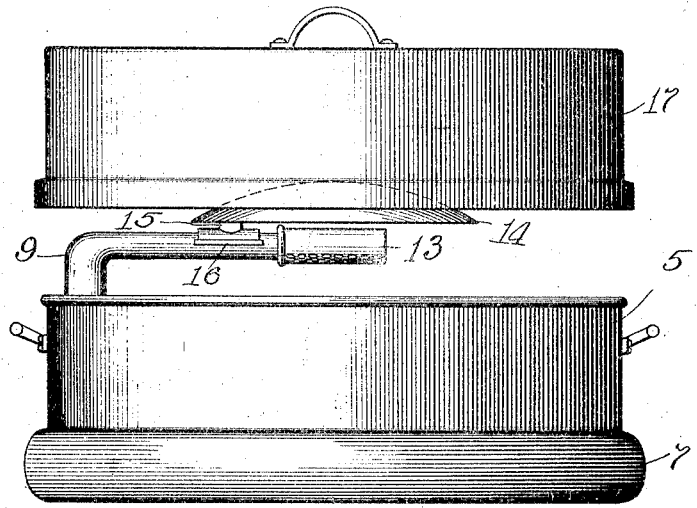
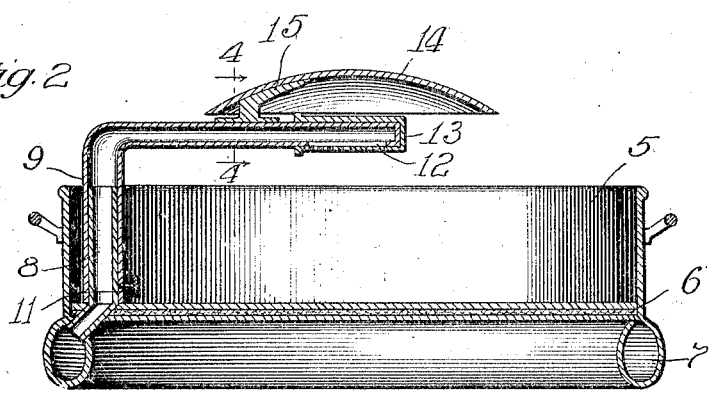
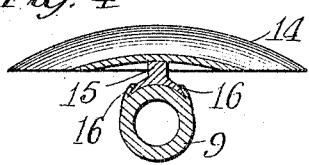
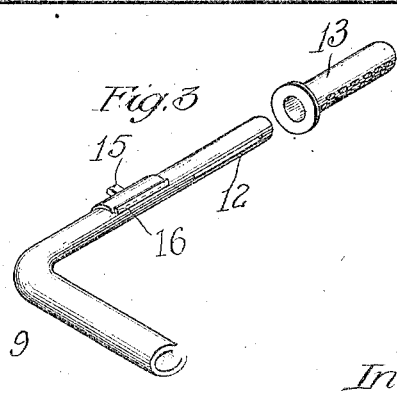
Witnesses
H R Leuhite
S J Wilson
Inventor
Julietta Kautz
By Lintheum Belt - Fuller
Attys

UNITED STATES PATENT OFFICE.

JULIETTA KAUTZ, OF CHICAGO, ILLINOIS.

ROASTING-PAN.

965,636.

Specification of Letters Patent.  Patented July 26, 1910.

Application filed December 6, 1909.  Serial No. 531,561.

*To all whom it may concern:*

Be it known that I, JULIETTA KAUTZ, a citizen of the United States, residing at Chicago, in the county of Cook and State of Illinois, have invented certain new and useful Improvements in Roasting-Pans, of which the following is a specification.

The object of this invention is primarily to provide a roasting pan in which a roast may be evenly and uniformly cooked without drying or scorching its surface or losing any of its nutritious juices.

In roasting meats with the ordinary type of roasting pan, it is necessary to provide a small quantity of water or other liquid in the bottom of the pan in order to prevent the roast from burning onto the bottom, which liquid is usually poured over the upper surface of the roast at intervals for the purpose of basting it. As is well known, this alternate moistening and drying of the surface of the meat while it is cooking, produces a crisp and hard surface thereon, which is of little nutritive value; and furthermore, the bottom of the roast which is constantly immersed in the water, becomes soft thus destroying the fiber thereof to a certain extent so that the fibers will be easily drawn apart, thereby allowing the juices of the meat to escape. In my invention I have overcome these objectionable features by providing a pan in which it is not necessary to provide any water in its bottom, either to prevent the roast from burning or sticking on the bottom or to provide a liquid with which the roast may be basted. By providing the bottom of my pan with an asbestos lining, all danger of the roast burning on the bottom of the pan is obviated, and by permitting a constant impingement of steam upon the surface of the roast while it is cooking, it is kept constantly moist and basted and never becomes dry or scorched.

While it is evident that my invention may be carried out in a variety of forms, I have chosen to illustrate one preferred embodiment thereof in the accompanying drawings, the scope of the invention being fully set forth in the appended claims.

Referring to the particular embodiment disclosed in the drawing Figure 1 is an elevation thereof showing the cover removed. Fig. 2 is a section taken through the center of Fig. 1, and longitudinally of the steam pipe. Fig. 3 is a perspective of the steam pipe and regulating cap, and Fig. 4 is a section on the line 4—4 of Fig. 2.

The roasting pan comprises in this instance, the roasting chamber 5, provided with a bottom having an asbestos lining 6, which prevents the burning and sticking of the roast to the bottom of the pan. Below the bottom of the pan there is provided a water chamber or receptacle 7, which in this particular embodiment is shown as a tube or pipe secured near the outer edge of the pan bottom, and providing a support therefor, and which keeps the bottom of the pan away from the oven or grate. It will be understood that this water chamber may be of any other preferred form. To the water chamber is connected a vertical section of pipe 8, which extends upwardly into the pan and through which water may be poured into the water chamber. It also serves as a steam outlet for the water chamber, and in order to conduct the steam issuing therefrom to the desired location relatively to the roast, there is adjustably secured to the pipe 8, an elbow pipe 9 by means of the set screw 11. Near the outer closed end of the pipe 9, there is provided a longitudinal slot 12, with which is adapted to register a series of perforations through a cap 13, which fits over the end of the pipe. By turning this cap angularly on the pipe, thus bringing more or less of the perforations of the cap into alinement with the slot 12, it will be apparent that the position of the steam outlet relatively to the roast, can be varied as desired, by raising or lowering the pipe 9 upon the pipe 8, and its lateral position may also be varied by angular movement around the pipe 8. When it has been properly positioned it may be locked in that position by the set screw 11.

Ordinarily when the pan is used for roasting purposes, no cover is employed in connection therewith, and in order to insure that the steam shall be brought into contact with the surface of the roast, I have provided a curved deflector or shield 14, preferably of concave shape, which is provided near one of its ends with a supporting stud or lug 15. The lower side of this stud or lug is curved to conform to the shape of the pipe 9, and is adapted to be attached to the pipe by sliding its lower edge under the flanges 16 provided upon the upper side of the steam pipe, as clearly shown in Fig. 4. By means of this deflector the steam is deflected evenly over the surface of the roast and any condensation of steam which may take place on the under side of the deflector, will run down and drip off from the edges of the deflector upon the roast, thereby keeping it in a moist condition and constantly basted. If preferred, however, a cover 17 may be employed in connection with my roasting pan, and its use is particularly desirable in cooking meats which it is desired to steam, as for instance in making pot roasts.

It is obvious that the cap 13 and the shield 14 may be dispensed with under certain conditions, thereby permitting the steam to escape directly from the slot 12 upon the roast. It is also obvious that when it is desired to fill the water chamber 7, it is only necessary to slip the pipe 9 off of the pipe 8 whereupon water may be readily poured into the chamber through the pipe.

Various other modified forms may be made without departing from the spirit of this invention; therefore, I do not wish to confine myself to the exact embodiment of my invention shown and described, but wish to claim all such modified forms as would come properly within the general scope of the invention.

What I claim is:

1. A roasting pan comprising a roasting chamber, an annular water chamber disposed beneath the perimeter of the bottom of the roasting chamber, said chambers having communication one with the other through a single passageway, a pipe constituting said passageway and projecting into the roasting chamber, an elbow pipe adjustably secured thereon and provided with a longitudinally disposed discharge opening, and a deflector removably mounted on said elbow pipe above the discharge opening therein to deflect the issuing steam and the condensations therefrom over the surface of a roast.

2. A roasting pan having an elevated bottom supported around its periphery upon an inclosed water chamber, side walls rising from said water chamber and forming with said raised bottom a roasting chamber, a pipe, forming the only communication between said water and roasting chambers, projecting upwardly into the roasting chamber, a second pipe removably secured thereon and provided with a longitudinal slot adjacent its outer end, a perforated cap disposed over said slot and adjustable on the pipe to regulate the discharge from the said pipe, and means for deflecting the steam and moisture escaping from the water chamber over the surface of a roast in the roasting chamber.

JULIETTA KAUTZ.

Witnesses:
I. J. WILSON,
M. A. KIDDIE.